J. TRIPP.
COTTON-PICKER.

No. 189,815.  Patented April 17, 1877.

2 Sheets—Sheet 1.

WITNESSES:
Jas. G. Hutchinson
J. Wm Mister

INVENTOR:
James Tripp
Edson Bros.
Attorneys

2 Sheets—Sheet 2

J. TRIPP.
COTTON-PICKER.

No. 189,815. Patented April 17, 1877.

WITNESSES:
Jas. O. Hutchinson
Wm Miller

INVENTOR
James Tripp
Edson Bros,
Attorney

N. PETERS, PHOTO-LITHOGRAPHER, WASHINGTON, D. C.

UNITED STATES PATENT OFFICE.

JAMES TRIPP, OF COLDWATER, MICHIGAN.

IMPROVEMENT IN COTTON-PICKERS.

Specification forming part of Letters Patent No. 189,815, dated April 17, 1877; application filed February 27, 1877.

*To all whom it may concern:*

Be it known that I, JAMES TRIPP, of Coldwater, in the county of Branch and State of Michigan, have invented certain new and useful Improvements in Cotton-Pickers; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1:
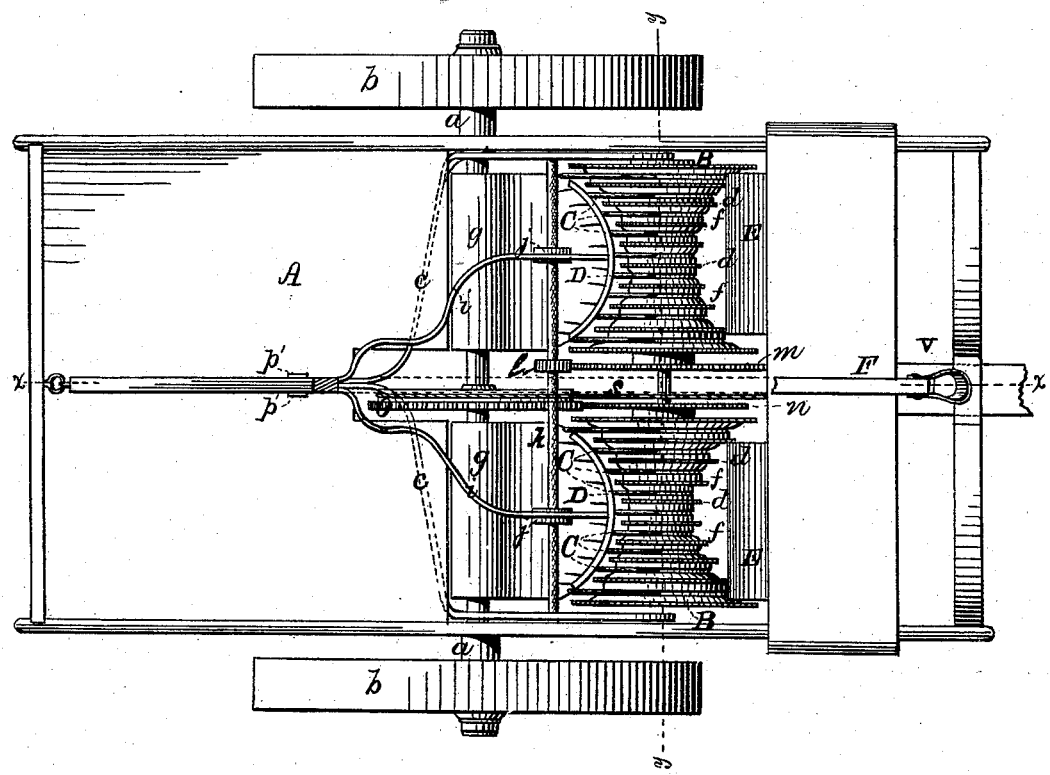
Figure 2:
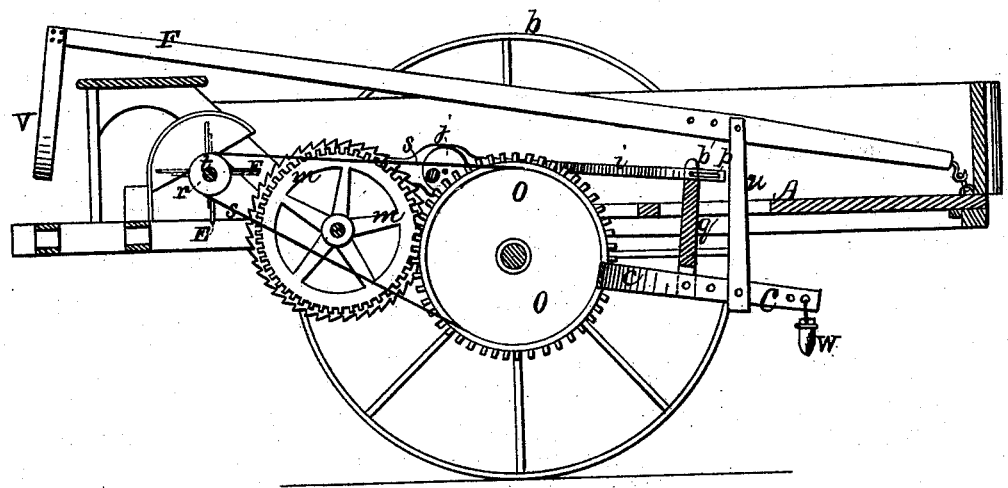

Figure 1, Sheet 1, is a plan view of my improved cotton-picker. Fig. 2, Sheet 2, is a longitudinal section; and Figs. 3 and 4, sectional views thereof.

Corresponding parts in the several figures are denoted by like letters.

This invention relates to a certain improvement in cotton-pickers; and it consists of mechanism, substantially as hereinafter more fully set forth and claimed.

Figure 3:
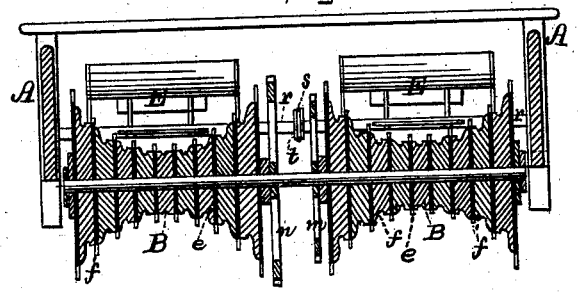
Figure 4:
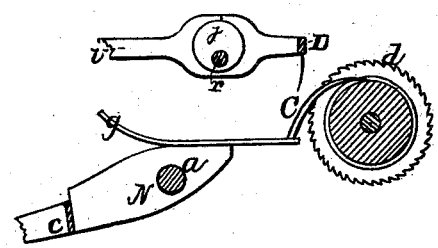

In the annexed drawing, A refers to a vehicle or wagon, having its axle $a$ provided with broad-tired wheels $b$ $b$, which may be supplied with spurs or projections to assist their driving-power. $c$ is a metallic frame pivoted upon the axle $a$, and forming bearings for the axis of the cylinders B B. The cylinders B B are recessed or concaved in longitudinal section, as seen in Fig. 3, in order to conform to the shape of the bushes from which the cotton is to be picked. The said cylinders are provided with roughened surfaces or teeth $d$ $d$ $d$. In the present instance the teeth are made upon disks $e$ $e$ $e$, which conform, in diameter, to the concavity of the cylinders, and divide the latter up into small sections $f$ $f$ $f$, which separate the disks, and are provided with grooves, the object of which will appear hereinafter. C C are two series of fingers, fastened to plates $g$ $g$, preferably slightly curved, and connected, by bars or arms $n$ $n$, to the frame $c$.

The fingers C C reach or extend up above the cylinders B B, and in close proximity with their teeth $d$ $d$, and enter the grooves between the latter, before alluded to. These fingers loosen and free the picked cotton from the cylinders or pickers B B. D D are combs or rakes curved to conform to the shape of, and disposed contiguous to, the cylinders B B, and having their arms $i$ $i$ connected, by eccentrics or cranks $j$ $j$, to the shaft $k$, driven by the cogs $l$ $m$, the latter being secured upon the axis of the cylinders, to which motion is imparted by the gearing $n$ $o$ upon the same axis and the axle of the driving and transporting wheels $b$ $b$. The rear ends of the arms $i$ $i$ are slotted, as at $p$, and receive studs or pins $p'$ $p'$ upon a bar or upright, $q$, fastened to the frame $c$, to allow the rakes or combs a limited movement as they are operated by the eccentrics or cranks $j$ $j$. The rakes D D rake the loosened cotton into the vehicle.

To a shaft, $r$, having its bearings in ears or studs in the forward end of the vehicle, and adjacent to the cylinders or pickers B B, are attached fans or blowers E E, of any suitable construction, for fanning dust, &c., from the cotton, by which the loosened cotton will also be blown onto the teeth of the cylinders. The fans are driven by a belt, $s$, passing around a pulley, $t$, and in a groove in the periphery of the cog-wheel $o$ upon the axle of the driving-wheels.

To the frame $c$, supporting the picking-cylinders, &c., is linked, as at $u$, or otherwise suitably connected thereto, a pole or lever, F, connected to the rear end of the vehicle, and having depending from its forward or free end a bow or stirrup, $v$, to receive the foot of the driver or operator.

By lowering or raising the forward end of the lever F under the control of the foot of the driver, it will be seen that the picking-cylinders will be correspondingly affected, thus adapting them to rows of cotton of different heights.

To the rear end of the frame $c$ may be suspended a weight, $w$, to assist the lever F in elevating the picking-cylinders.

It will be observed that the fingers C C are bowed, so as to stand a little above, and shove the cotton off the teeth of the picking-cylinders, while their points or upper ends enter grooves therein, and thus keep them out of the way of the cotton.

Having thus described my invention, what I claim, and desire to secure by Letters Patent, is—

1. The recessed or concaved toothed cylinder B, having a series of circumferential grooves, in combination with the bowed fingers C C, the upper ends of which enter the said grooves, substantially as and for the purpose set forth.

2. The rake D, connected by an eccentric or crank to a shaft, disposed contiguous to the cylinder B, substantially as and for the purpose set forth.

3. In combination with the picking-cylinder B, the fan or blower E, attached to a shaft arranged in proximity with the said cylinder, and driven by gearing, &c., substantially as and for the purpose set forth.

In testimony that I claim the foregoing as my own I hereunto affix my signature in presence of two witnesses.

JAMES TRIPP.

Witnesses:
A. J. McGOWAN,
J. H. MONTAGUE.